United States Patent
Kishore et al.

(10) Patent No.: US 8,145,882 B1
(45) Date of Patent: Mar. 27, 2012

(54) APPARATUS AND METHOD FOR PROCESSING TEMPLATE BASED USER DEFINED INSTRUCTIONS

(75) Inventors: Karagada Ramarao Kishore, Saratoga, CA (US); Gideon Intrater, Sunnyvale, CA (US); Xing Xu Jiang, Palo Alto, CA (US); Maria Ukanwa, Morgan Hill, CA (US)

(73) Assignee: MIPS Technologies, Inc., Mountain View, CA (US)

( * ) Notice: Subject to any disclaimer, the term of this patent is extended or adjusted under 35 U.S.C. 154(b) by 526 days.

(21) Appl. No.: 11/442,696

(22) Filed: May 25, 2006

(51) Int. Cl.
G06F 15/16 (2006.01)

(52) U.S. Cl. .................................................... 712/34

(58) Field of Classification Search .................. 712/34, 712/35
See application file for complete search history.

(56) References Cited

U.S. PATENT DOCUMENTS

| | | | | |
|---|---|---|---|---|
| 5,218,711 A * | 6/1993 | Yoshida | ........................ | 712/34 |
| 5,848,289 A * | 12/1998 | Studor et al. | .................... | 712/32 |
| 5,909,565 A * | 6/1999 | Morikawa et al. | ........... | 712/200 |
| 5,987,594 A * | 11/1999 | Panwar et al. | ................ | 712/216 |
| 5,996,064 A * | 11/1999 | Zaidi et al. | .................... | 712/216 |
| 6,237,079 B1 * | 5/2001 | Stoney | ........................... | 712/34 |
| 7,079,147 B2 * | 7/2006 | Wichman et al. | ............ | 345/503 |
| 7,308,320 B2 * | 12/2007 | Miyamori | ....................... | 700/2 |
| 7,493,470 B1 * | 2/2009 | Cumplido et al. | ............. | 712/34 |
| 7,493,471 B2 * | 2/2009 | Favor et al. | ..................... | 712/34 |
| 7,587,579 B2 * | 9/2009 | Boukaya et al. | ................ | 712/38 |
| 2002/0199083 A1 * | 12/2002 | Kao et al. | ..................... | 712/209 |
| 2004/0044878 A1 * | 3/2004 | Evans et al. | ..................... | 712/34 |
| 2005/0038975 A1 * | 2/2005 | Hudepohl et al. | .............. | 712/34 |
| 2005/0055594 A1 * | 3/2005 | Doering et al. | ............... | 713/375 |
| 2006/0010305 A1 * | 1/2006 | Maeda et al. | .................... | 712/34 |
| 2008/0059771 A1 * | 3/2008 | Svendsen et al. | ............. | 712/218 |
| 2008/0209181 A1 * | 8/2008 | Petkov et al. | .................. | 712/220 |

FOREIGN PATENT DOCUMENTS

EP 1615123 A1 * 1/2006

OTHER PUBLICATIONS

"MIPS embraces configurable technology" Halfhill, Tom R.; Microprocessor Report, v17, n3, p. 7 (9), Mar. 2003.*
Jeong et al. (In-Order Issue Out-of-Order Execution Floating-Point Coprocessor for Calm RISC32), Proceedings of the 15th IEEE Symposium on Computer Arithmetic; 2001; pp. 195-200.*
Cortus (APS3 Datasheet), 2006; 4 pages.*
Cortus (APS2 Datasheet); Feb. 2006; 2 pages.*
Cortus (APS DSP), 2007; 4 pages.*
Halfhill, Tom (Itty-Bitty 32-Bitters) Microprocessor Report, May 11, 2009; pp. 1-11.*
Altera (Custom Instructions for the Nios Embedded Processor); Sep. 2002, ver. 1.2, Application Note 188; 24 pages.*

(Continued)

*Primary Examiner* — Keith Vicary
(74) *Attorney, Agent, or Firm* — Cooley LLP

(57) ABSTRACT

A system implemented in hardware includes a main processing core decoding instructions for out of order execution. The instructions include template based user defined instructions. A user execution block executes the template based user defined instructions. An interface is positioned between the main processing core and the user execution block. A computer readable medium includes executable instructions to describe a processing core supporting execution of a proprietary instruction set and decoding of customized instructions that adhere to a specified pattern. The specified pattern includes a source, a destination and a latency period. A user execution block is connected to the processing core to execute the customized instructions.

6 Claims, 6 Drawing Sheets

| Instruction bits[3:0] | Register Format | | | | | | Latency | Private State |
|---|---|---|---|---|---|---|---|---|
| | Source Registers (at most 1 accumulator and 2 GPRs, rs or rt, can be valid for a given row) | | | | Destination Register (only 1 of the 6 destinations can be valid for a given row) | | 3, 5 or Long | Y or N |
| | rs | rt | rd (0..3) | rd_acc_src (Y or N) | rt | rd | rd_acc_dst (Y or N) | | |
| 0000 | | | | | | | | | |
| 0001 | | | | | | | | | |
| 0010 | | | | | | | | | |
| 0011 | | | | | | | | | |
| 0100 | | | | | | | | | |
| 0101 | | | | | | | | | |
| 0110 | | | | | | | | | |
| 0111 | | | | | | | | | |
| 1000 | | | | | | | | | |
| 1001 | | | | | | | | | |
| 1010 | | | | | | | | | |
| 1011 | | | | | | | | | |
| 1100 | | | | | | | | | |
| 1101 | | | | | | | | | |
| 1110 | | | | | | | | | |
| 1111 | | | | | | | | | |

OTHER PUBLICATIONS

Altera (Nios II Custom Instruction User Guide); Dec. 2004; 46 pages.*
Gonzalez (Xtensa: A Configurable and Extensible Processor); IEEE Micro; vol. 20, Issue 2 (Mar. 2000); pp. 60-70.*
Lazanyi (Instruction Set Extension Using Microblaze Processor); International Conference on Field Programmable Logic and Applications, 2005; 2 pages.*
Martin (Recent Developments in Configurable and Extensible Processors); IEEE Application-specific Systems, Architectures and Processors (ASAP'06), Sep. 11, 2006, 6 pages.*
Wang et al. (Hardware/Software Instruction Set Configurability for System-on-Chip Processors); Design Automation Conference, Jun. 2001, 5 pages.*

* cited by examiner

| Instruction bits[3:0] | Register Format | | | | | | Latency | Private State |
|---|---|---|---|---|---|---|---|---|
| | Source Registers (at most 1 accumulator and 2 GPRs, rs or rt, can be valid for a given row) | | | | Destination Register (only 1 of the 6 destinations can be valid for a given row) | | 3, 5 or Long | Y or N |
| | rs | rt | rd (0..3) | rd_acc_src (Y or N) | rt | rd | rd_acc_dst (Y or N) | | |
| 0000 | | | | | | | | | |
| 0001 | | | | | | | | | |
| 0010 | | | | | | | | | |
| 0011 | | | | | | | | | |
| 0100 | | | | | | | | | |
| 0101 | | | | | | | | | |
| 0110 | | | | | | | | | |
| 0111 | | | | | | | | | |
| 1000 | | | | | | | | | |
| 1001 | | | | | | | | | |
| 1010 | | | | | | | | | |
| 1011 | | | | | | | | | |
| 1100 | | | | | | | | | |
| 1101 | | | | | | | | | |
| 1110 | | | | | | | | | |
| 1111 | | | | | | | | | |

*FIG. 4*

| Instruction bits[3:0] | Register Format | | | | | | | Latency | Private State |
|---|---|---|---|---|---|---|---|---|---|
| | Source Registers (at most 1 accumulator and 2 GPRs, rs or rt, can be valid for a given row) | | | | Destination Register (only 1 of the 6 destinations can be valid for a given row) | | | 3, 5 or Long | Y or N |
| | rs | rt | rd (0..3) | rd_acc_src (Y or N) | rt | rd | rd_acc_dst (Y or N) | | |
| 0000 | 1 | 1 | - | N | 0 | 1 | N | 3 | N |
| 0001 | 1 | 1 | - | N | 0 | 1 | N | 3 | Y |
| 0010 | 1 | 1 | - | N | 0 | 1 | N | 5 | N |
| 0011 | 1 | 1 | - | N | 0 | 1 | N | 5 | Y |
| 0100 | 1 | 1 | - | N | 0 | 1 | N | Long | N |
| 0101 | 1 | 1 | - | N | 0 | 1 | N | Long | Y |
| 0110 | 1 | 1 | 0 | Y | 0 | 0 | Y | Long | N |
| 0111 | 1 | 1 | 0 | Y | 0 | 0 | Y | Long | Y |
| 1000 | 1 | 0 | - | N | 1 | 0 | N | 3 | N |
| 1001 | 1 | 0 | - | N | 1 | 0 | N | 3 | Y |
| 1010 | 1 | 0 | - | N | 1 | 0 | N | 5 | N |
| 1011 | 1 | 0 | - | N | 1 | 0 | N | 5 | Y |
| 1100 | 1 | 0 | 1 | Y | 0 | 1 | Y | 5 | Y |
| 1101 | 1 | 0 | 1 | Y | 0 | 1 | Y | Long | Y |
| 1110 | 0 | 0 | - | N | 0 | 0 | N | 5 | Y |
| 1111 | 0 | 0 | - | N | 0 | 0 | N | Long | Y |

*FIG. 5*

APPARATUS AND METHOD FOR PROCESSING TEMPLATE BASED USER DEFINED INSTRUCTIONS

BRIEF DESCRIPTION OF THE INVENTION

This invention relates generally to data processors. More particularly, this invention relates to data processors that support user defined instructions specified through a template.

BACKGROUND OF THE INVENTION

FIG. 1 illustrates a prior art data processing system 100 with a main core 102, which processes in order instructions. The main core 102 is limited to a fixed instruction set architecture, such as the MIPS® Instruction Set Architecture (ISA) from MIPS Technologies, Inc., Mountain View, Calif. The system 100 also includes a user execution block 104, which is configured to support user defined instructions. For example, the user defined instructions may be CorExtend™ instructions, a user defined instruction set supported by processors sold by MIPS Technologies, Inc., Mountain View, Calif.

FIG. 1A illustrates the main core 102 communicating with the user execution block 104 via an interface 106. The main core 102 includes a number of pipeline stages 110-124. The user execution block 104 includes a decoder 130 to decode user defined instructions and an execution block 132 to execute the user defined instructions. As shown in FIG. 1A, the execution of the user defined instructions is coordinated through the pipeline of the main core 102. In particular, an instruction cache 110 of the main core 102 passes instructions to a decoder 112 and the decoder 130 of the user execution block 130. Instructions of the instruction set supported by the main core 102 are decoded at the decoder 112. User defined instructions are decoded at the user execution block at decoder 130. The decoded instruction is then dispatched by dispatch unit 114. The operands of the instructions are then read at block 116. If an instruction specifies a bypass operation (e.g., a user defined instruction), the instruction is routed by bypass block 118 to the user execution block 104 for execution in the execution block 132. Otherwise, the instruction is executed in the execution block 120 of the main core 102. Results from execution blocks 120 and 132 are routed to a cache 122 and are then applied to a write state 124. Thus, the user defined instructions are incorporated into the main core processor flow, but are decoded and executed in the user execution block 104.

This is an efficient system when the main core 102 is a simple in order machine or a machine with a short pipeline. If the main core is an out of order execution machine, e.g., a deeply pipelined machine, then the user execution block 104 has to inform the main core 102 about the nature and properties of the user defined instruction. This increases latency as the main core 102 waits for information from the user execution block 104. This also results in standard instruction set instructions being blocked.

In view of the foregoing, it would be desirable to provide an efficient technique for supporting user defined instructions in an out of order processor.

SUMMARY OF THE INVENTION

The invention includes a system with a main processing core decoding out of order instructions, including template based user defined instructions. A user execution block connected to the main processing core executes the template based user defined instructions.

The invention also includes a processor with a processing core supporting execution of a standard instruction set and decoding of customized instructions that adhere to a specified pattern, wherein the specified pattern includes a source, a destination, and a latency period. A user execution block connected to the processing core executes the customized instructions.

The invention also includes a computer readable medium with executable instructions to describe a processing core supporting execution of a standard instruction set and decoding of customized instructions that adhere to a specified pattern, wherein the specified pattern includes a source, a destination, and a latency period. A user execution block connected to the processing core executes the customized instructions.

The invention includes a method of executing a standard instruction set and processing a template based instruction set, wherein each instruction of the template based instruction set includes a source, a destination and a latency period.

The invention also includes a method of executing instruction set architecture instructions on a core, decoding user defined instructions on the core, and executing the user defined instructions on a user execution block.

BRIEF DESCRIPTION OF THE FIGURES

The invention is more fully appreciated in connection with the following detailed description taken in conjunction with the accompanying drawings, in which:

FIG. 4 illustrates a blank template that may be used to specify user defined instructions in accordance with an embodiment of the invention.

FIG. 5 illustrates a filled template specifying user defined instructions in accordance with an embodiment of the invention.

Like reference numerals refer to corresponding parts throughout the several views of the drawings.

DETAILED DESCRIPTION OF THE INVENTION

Figure 2:
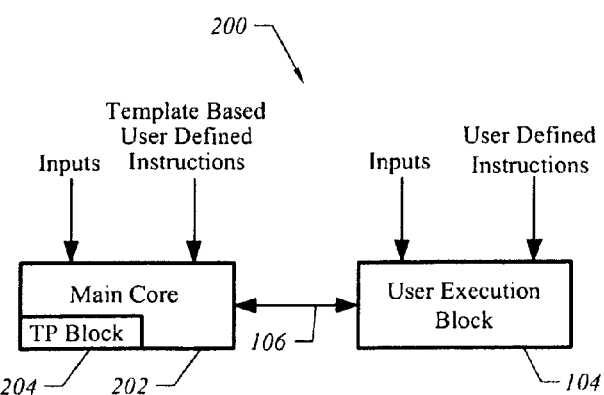
FIG. 2 illustrates a system with a main processing core that executes template based user defined instructions in accordance with an embodiment of the invention.

FIG. 2 illustrates a system 200 configured in accordance with an embodiment of the invention. The system 200 includes a main core 202, which supports out of order instructions. The core is configured to process template based user defined instructions. The template based user defined instructions are customized instructions that adhere to a specified pattern of information. In one embodiment, the template specifies at least an instruction bit pattern, a source and a destination. For example, the template may specify an operand source that is either a register or an accumulator. Similarly, the template may specify a destination that is either a register or an accumulator. The template may also specify a latency and whether the instruction implicates a private state (e.g., proprietary registers), as discussed below.

Figure 1:
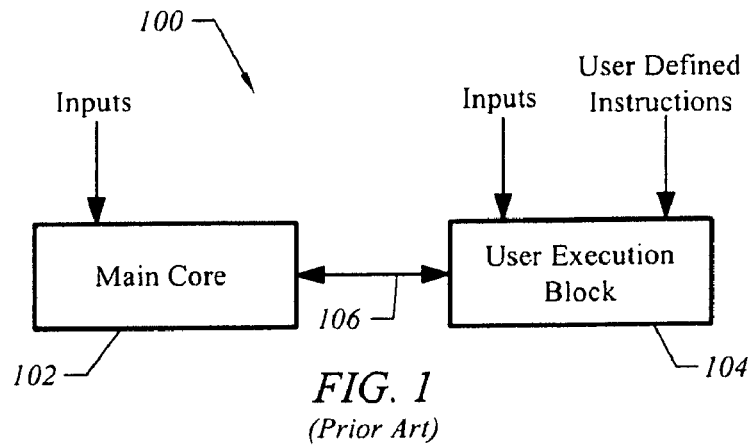
FIG. 1 illustrates a prior art system with a main processing core and a user execution block to support user defined instructions.
Figure 1A:
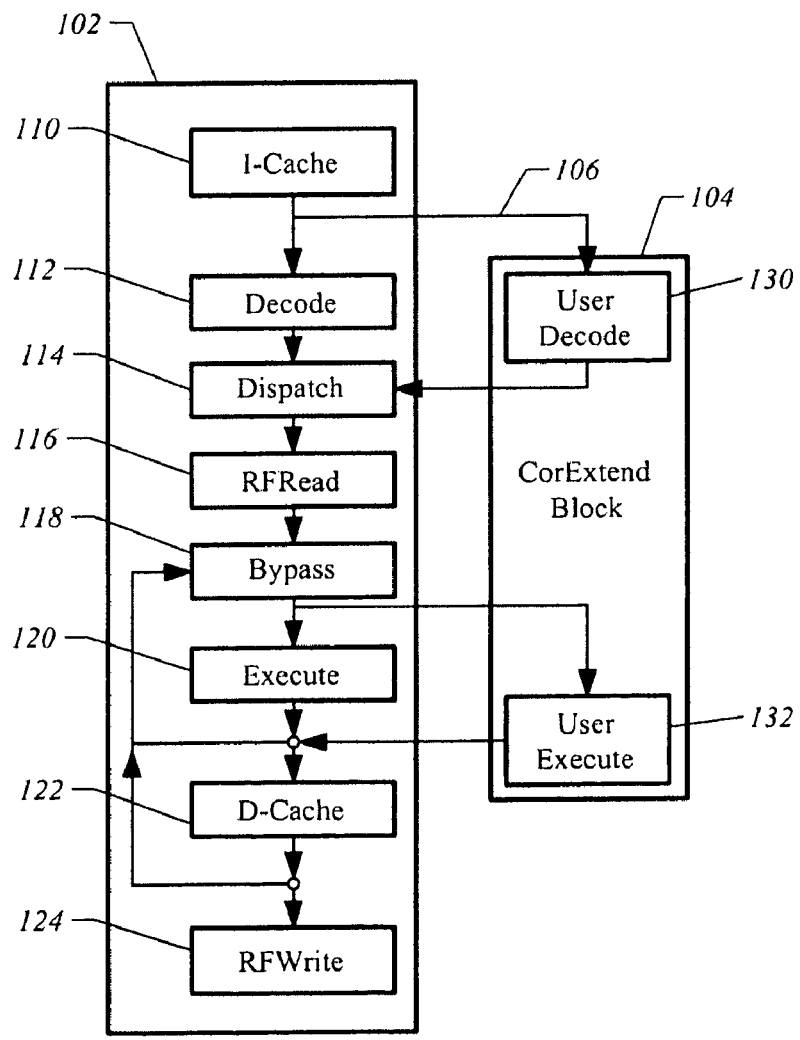
FIG. 1A illustrates processing stages associated with the system of FIG. 1.

The template based user defined instructions are specified prior to synthesis of the main core 202. The template characteristics are then synthesized into the main core 202 to form a Template Processing (TP) block 204. The TP block 204 operates to decode the template based user defined instructions. Thus, the decode block 130 of the user execution block 104 of FIG. 1A is essentially collapsed into the decode block 112 of the main core 202. The template based user defined instructions are still executed in the execution block 132 of the user extension block 104.

The invention may be implemented in any number of device architectures. By way of example, the invention will be disclosed in connection with a MIPS32 architecture, available from MIPS Technologies, Inc., Mountain View, Calif.

Figure 3:
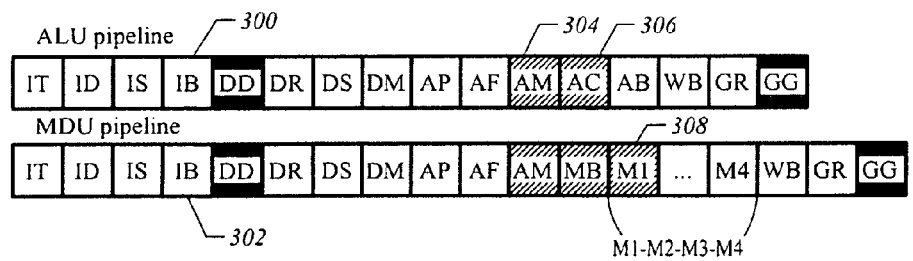
FIG. 3 illustrates pipelines that may be utilized in accordance with an embodiment of the invention.

FIG. 3 illustrates a deeply pipelined arithmetic logic unit (ALU) pipeline 300 and Multiply Divide Unit (MDU) 302 associated with the MIPS32 architecture. As used herein, the term deeply pipelined contemplates at least 10 pipeline stages. The ALU pipeline 300 includes 16 stages, while the MDU pipeline 302 includes 17 stages, in this example.

Figure 6:
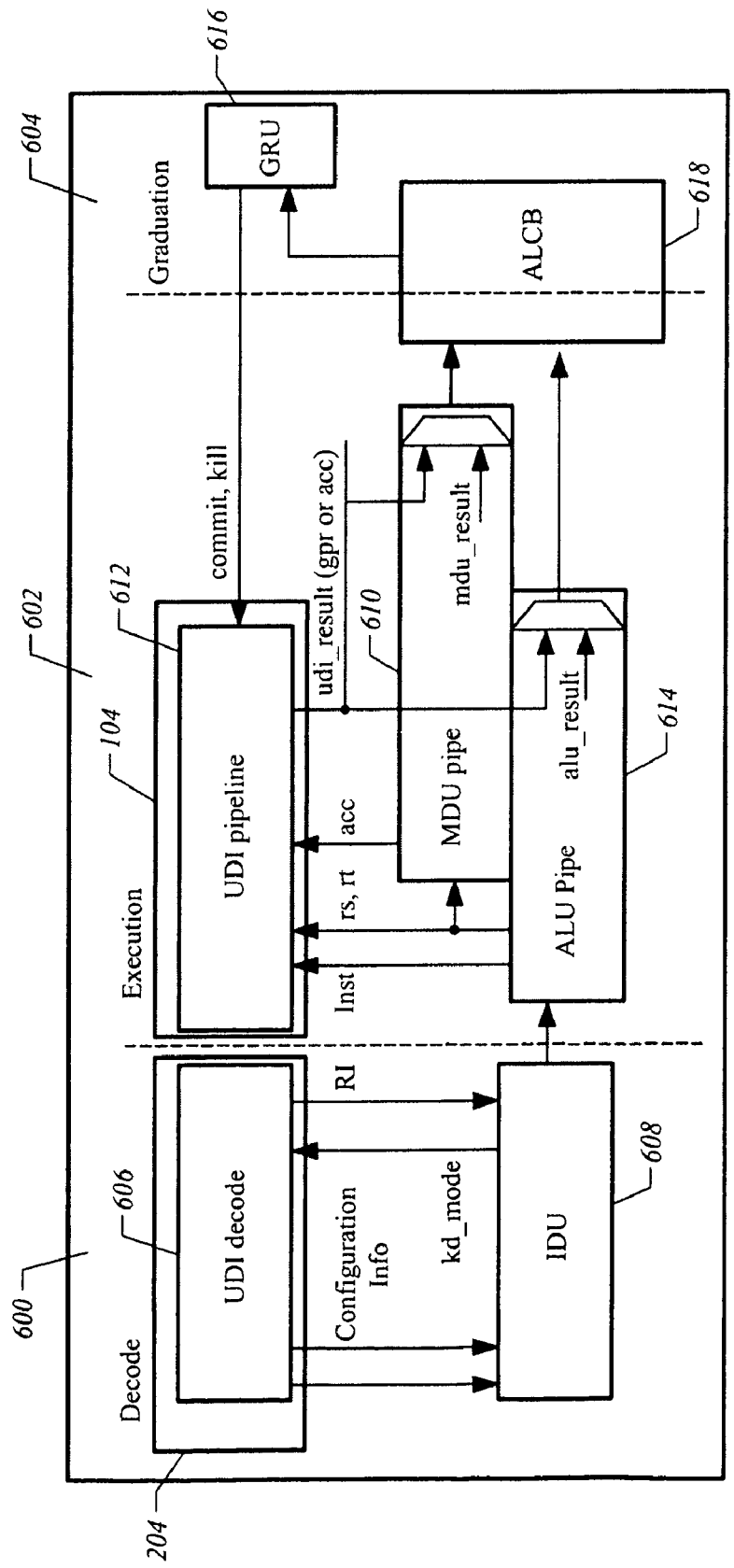
FIG. 6 illustrates processing modules that may be used in accordance with an embodiment of the invention.

In one embodiment, the TP block 204 interfaces to several units of the main core (e.g., the Instruction Decode Unit (IDU), Multiply Divide Unit (MDU), and General Register Unit (GRU)). FIG. 6, which will be discussed in detail below, illustrates these components and others.

Referring to FIG. 3, the operands and other instruction control signals are generated by the ALU Pipe 300. However, these are sent to the TP block 204 via the MDU. This reduces the number of units in the core 202 interfacing directly with the TP block 204. Preferably, the user defined instructions only modify the TP block 204 and not any other module in the main core 202.

As previously indicated, the TP block 204 is synthesized with the main core 202. Preferably, the synthesis of the TP block 204 is rolled into the synthesis flow for the rest of the core.

In one embodiment, the opcode reserved for TP block instructions is SPECIAL2, which has bits[31:26]=6'b 011100 and bits[5:0]=6'b0 1xxxx. This allows for 16 distinct opcodes that are distinguishable by the IDU. The TP block 204 may have more opcodes by using the remaining bits in the instructions, however, the IDU will not recognize them as separate instructions. The user is required to give the UDI instruction formats to the IDU at configuration time.

The main core 202 sends the instruction to the TP block 204 in the AM stage 304, it sends the GPR operands rs and rt in the AC stage 306, and the accumulator operand in the Ml stage 308. The instruction is sent a cycle before execution, so that the TP block 204 can perform a basic decode. The instructions are dispatched as soon as the operands become available.

In one embodiment, the instruction decoding and renaming is done in the IDU. Register renaming is done for all destinations so that output dependencies are removed ahead of time. In order to do this, it is required to know the destination register at decode time. The MIPS ISA allows for destination registers to be in different instruction positions based on instruction type (I-type, J-type or R-type); the IDU detects and determines the destination. However, for a user defined instruction, the instruction type format is not fixed. In order to eliminate stalls or round trip communication with the TP block 204, the instruction type formats for the 16 user defined instructions are fixed ahead of time. The user can define the instruction format in a table, such as shown in FIG. 4. For example, the table of FIG. 4 is supplied on a monitor of a computer, allowing the user to enter values specifying user defined instructions. Templates other than a table may be used in accordance with embodiments of the invention.

Consider an out of order issue machine that uses predictable instruction latencies to determine the bypass opportunities and operand readiness for outstanding instructions and dispatches consumers only when its operands are guaranteed to be available. Because of this, user defined instructions need to have a predictable latency. In order to not create any stall conditions or new bypass networks, in one embodiment of the invention, the user defined instructions are restricted to the following latencies: 3 cycles (similar to ALU pipe: 2 cycle execution latency+1 cycle writeback into the completion buffer), 5 cycles (similar to MDU pipe) or more than 5 cycles. These numbers refer to the actual latency of the instruction in the user defined instruction execution pipe. The GPR/Accumulator results produced by a user defined instruction will not be bypassed until they are written into a completion buffer, thus the effective bypass latency will be 3, 6 or more than 5 cycles, respectively.

The TP block 204 may contain private state that can be used and modified by user defined instructions. Since this state is not visible to the pipe of the main core 202, instructions have to be issued to the TP block 204 in program order. If TP block 204 contains such state and an instruction depends on the state, it should be indicated by the opcode. The TP block 204 will use this information to determine if the user defined instructions have to issue in program order relative to other user defined instructions.

Pipe instructions may be executed out of order, but are always completed in program order. This is accomplished by holding the results in a completion buffer (e.g., ALCB or AGCB) temporarily before committing them to architectural state. If user defined instructions are written into GPR or Accumulator registers, then they can write the results into the ALCB completion buffer. Based on the latency of the user defined instruction, the ALU pipe or MDU pipe's write port into the completion buffer is used. If the TP block 204 has private state, it buffers those results temporarily after execution. The number of such completion buffers determines the repeat rate of user defined instructions. For example, if there is a 3 entry completion buffer (FIFO structure) in the TP block 204, it allows for one user defined instruction every three cycles. The maximum depth of the FIFO should be indicated to the IDU at configuration time and the IDU will maintain a counter to determine the repeat rate of such instructions. The completion buffers for private state are written within the TP block at the end of execution. The FIFO entries are released when the instruction is ready to graduate from the pipe. The GRU sends a 'graduate' signal to the TP block at the completion of each UDI instruction regardless of whether it has private state or not. The counters maintaining the number of outstanding UDI instructions in flight is managed (increment/decrement) by the IDU. The initial value of this counter is set by a static signal from the TP block, which indicates the number of entries in the results FIFO within the TP block. Thus, while there is credit available, the repeat rate is one UDI instruction per cycle and a stall occurs until a credit becomes available.

The TP block 204 may be shared by multiple Thread Contexts (TCs). For each instruction that is sent to the TP block, the pipe sends an identifier which includes the {VPEid, TCid, instnId}. The TP block 204 uses this identifier when it writes its results back into the completion buffer to update GPRs or Accumulators. When there is a branch or any other pipeline flush condition, the GRU sends the {VPEid, TCid} along with the 'kill' signal. All instructions in the UDI pipe that belong to that {VPE, TC} are then killed.

FIG. 4 shows a template that may define the instruction formats and latencies for a given configuration. This table is used to configure the IDU and generate appropriate logic. This configuration option can be changed by a customer, but will be fixed once the block is synthesized. Note that in this embodiment, the source registers are restricted to be at most 2 GPRs and 1 accumulator. If there are 2 source GPRs, then they have to be rs and rt. If an Accumulator is used as a source, then the rd_acc_src bit is set and the accumulator number is indicated in the rd field. The destination can either be a GPR or one of the accumulators. If there is a GPR destination, it is rd or rt. If the accumulator is a destination, then the rd_acc_dst bit is set and the rd field contains the accumulator number.

FIG. 5 provides an example set of instructions specified in accordance with an embodiment of the invention. In this example, all 16 user defined instruction options are used and they have various attributes defined by the number and type of source operands, type of destination register, instruction latency and instructions dependency on private state within the TP block. This table can be configured at the time of hardening the core based on the target applications for that core.

There are several types of instruction decodes shown in this example:
- Instructions that use rs and rt as sources and rd as destination. This may be of 3, 5 or Long latency type and may or may not have private state (e.g., decodes 0000-0101).
- Instructions that use rs, rt and acc0 as sources and acc0 as destination. This may or may not have private state (e.g., decodes 0110-0111).
- Instructions that use rs and rt as source and rt as destination. This may be of 3 or 5 cycle latency and may or may not have private state (e.g., decodes 1000-1011).
- Instructions that use rs and acc0 as sources and acc0 as destination. This may or may not have private state (e.g., decodes 1110-1101).
- Instructions that do not have any GPR or accumulator registers as sources or destination but depends only on private state. This may have 5 or more cycle latency (e.g., decodes 1110-1111).

By allowing the TP block 204 to access the MDU accumulators, significant portions of the multiplier are reused, for example, SIMD multiply-accumulate, Q15 macs, saturating macs, or some combination thereof. Additionally, using the MDU accumulators as the local UDI accumulators allows existing context switch routines to work seamlessly with the UDI.

FIG. 6 illustrates a TP block 204, which is also referred to herein as a user defined instruction (UDI) decode block 606. FIG. 6 also illustrates a UDI pipeline 612, which forms a portion of the user execution block 104. The UDI pipeline 612 corresponds to the user execution block 132 of FIG. 1A. The remaining elements of FIG. 6 are resident in the main core 202. In particular, the main core includes an IDU 608, an MDU pipe 610, an ALU pipe 614, a GRU 616 and a completion buffer (ALCB) 618.

FIG. 6 illustrates that in an embodiment of the invention, signals are separated into 3 stages:
1. The decode stage 600 includes signals that connect between the UDI decode block 606 and the IDU 608.
2. The execution stage 602 includes signals to connect between the MDU 610 and the UDI pipeline 612. FIG. 6 shows the instruction and GPR operands rs and rt being generated by the ALU Pipe 614. In another embodiment, these operands flow through the MDU 610, so that only the MDU 610 connects to the UDI decode block 606 for execution related signals.
3. The graduation stage 604 includes signals that connect between the GRU 616 and UDI decode block 606.

If the TP block 204 is not pipelined and it is required to single issue the instructions through the block, then it can be accomplished by simply programming the latency attribute of all opcodes to be of long latency type. Then every user defined instruction follows the divide instruction flow. The long instruction flow means IDU 608 will block issue of a user defined instruction until the resource becomes available. The core sends the user defined instructions out of order if the instructions have source and destination registers from core registers (GPR and Accumulators) only. If the user defined instructions depend on private internal state, then they are issued in order with respect to other user defined instructions.

The following discussion is directed to various restrictions on one implementation of the UDI pipeline 612. The execution block pipeline is closely coupled to the main core pipeline. If a user defined instruction modifies the GPR or Accumulator, once issued from IDU 608, it has to provide the result in a fixed number of cycles or be treated as a Long instruction (in this case, it will freeze the MDU upon issuing). This means the TP block should never stall, which is not an issue if the TP block does not have internal state. However, if internal state is implemented, there will be some problems. It is possible that a user defined instruction that modifies internal state may have to wait an arbitrary number of cycles to graduate after it is completed. This happens because a long latency instruction that is ahead of the user defined instruction in a program may hold up graduation. This problem may be solved for other instructions by using the completion buffer structure. To address this issue, a custom TP block should satisfy the following conditions:
- The execution pipeline of UDI should never be stalled.
- If the TP block has internal state, it needs a structure similar to a completion buffer to hold the temporary result before it commits the instruction. The TP block manages this structure and writes the result into internal state upon graduation. If there is a kill/nullify, the TP block needs to invalidate either the whole structure or certain entries based upon thread IDs. The TP block indicates the number of buffers available to the IDU 608 as static configuration information. IDU 608 uses this information to ensure that the UDI has that number of instructions in flight. The credit system for incrementing and decrementing the number of instructions in flight is maintained within the IDU 608.
- If the TP block has internal states that instructions depend on, then those instructions are issued in order, and the above mentioned structure can be treated as FIFOs (Internal State FIFO). However, the FIFO might get full. IDU keeps track of how many free entries the FIFO has and will not issue an instruction modifying internal state if there is no empty space in the Internal State FIFO so that an overflow can never occur.

Figure 7:
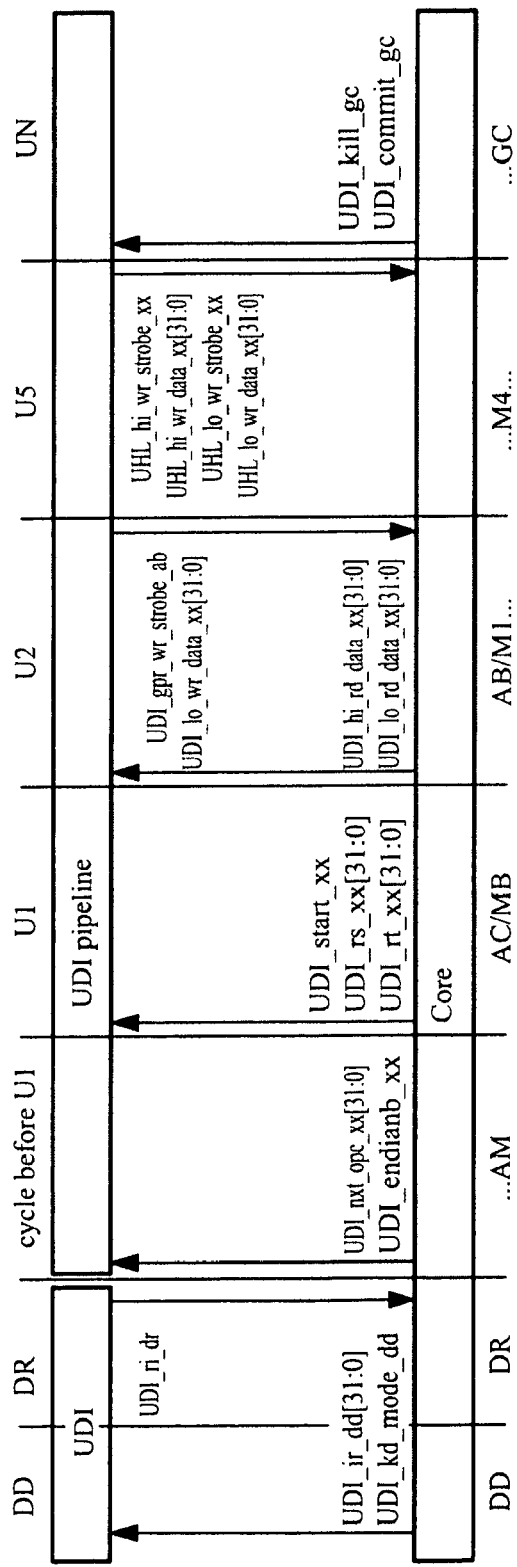
FIG. 7 illustrates signal and pipeline relationships associated with an embodiment of the invention.

The IDU 608 needs decode information about the user defined instructions. The IDU 608 needs information about the sources, destination, reserved instruction exception, and the specific latency information for the instruction. The customer provides this information through a template, see, for example, FIG. 5. This information can then be processed in the manner specified in FIG. 3. In the DD stage of FIG. 7, the IDU 608 sends the kernel_debug_mode information of the core to the TP block along with the instruction. The TP block looks at the instruction and the mode and informs the IDU if reserved_instruction (RI) exception is to be taken or not in DR stage. The information presented to the UDI in the Decode-stage DD should not be stored/used for later execution of the instruction as the UDI does not know whether or when to start execution of the instruction. The UDI expects the Instruction word and user/kernel mode to be register outputs.

After the DD stage, the UDI instruction goes through the IDU instruction ready logic and selection process and then enters the ALU Pipe. Other instruction information requested of the UDI concerns the latency cycles of the UDI instruction. The instruction is sent in the AM stage, and the latency count starts in the dispatch stage, which is AC/MB. For an instruction that starts in the AC stage and returns the result to the ALU Pipe in the AB stage, 2 cycles (AC-AB) expire. Note that the latency to bypass the results to another operation is only performed through the completion buffer. Therefore, an additional cycle of latency is added to the execution time, making the effective latency 3 cycles. Similarly, an instruction that starts in the AC stage and returns the result to the MDU Pipe in the M4 stage is 5 cycles ($MB_{MDU}$-$M1_{MDU}$-$M2_{MDU}$-$M4_{MDU}$).

Note that there is a hazard between when the core changes to/from kernel mode and when an RI exception indication is returned from the UDI module in the Decode stage. This hazard is due to the fact that the RI exception is determined using MDU-kd-mode-dd, but there may be a mode change later due to an instruction or exception currently in a later stage of the pipeline.

The instruction is sent again to the MDU/UDI in the AM stage from a register output. GPR data is sent to the MDU/UDI in the AC stage from a register output, and is sent along with a valid signal (UDI_start_xx). The valid signal indicates that the MDU/UDI can start execution of the instruction, if it was waiting for the data from GPR registers. This same valid signal guarantees accumulator data is ready one cycle later.

Accumulator data is sent to the UDI in stage M1. This is not directly from a flop, but includes the accumulator bypass which is equivalent to a 2-to-1 mux. Rather than sending GPR data and accumulator data together, each is sent as soon as it is ready (AC & MI respectively). A UDI instruction can use GPR sources, an accumulator source, UDI internal state sources, or any combination thereof.

The returned data is qualified by a write strobe signal from UDI to indicate that the result is available. UDI results sent to the core are killed/committed by the core. For UDI results written to UDI internal state, the core sends an explicit commit signal in the GC stage. The "kernel or debug" mode signal and the big endian mode signal are not used by MDU operations. They may be used by UDI. Note that there is a hazard between when endianness is changed and the execution of a user defined instruction whose operation is endianness dependent. This hazard is due to the fact that the UDI would start execution relying on the endianness indicated by MDU_endianb_am, but there may be a pending change in $Status_{RE}$ in a later stage of the pipeline.

Figure 8:
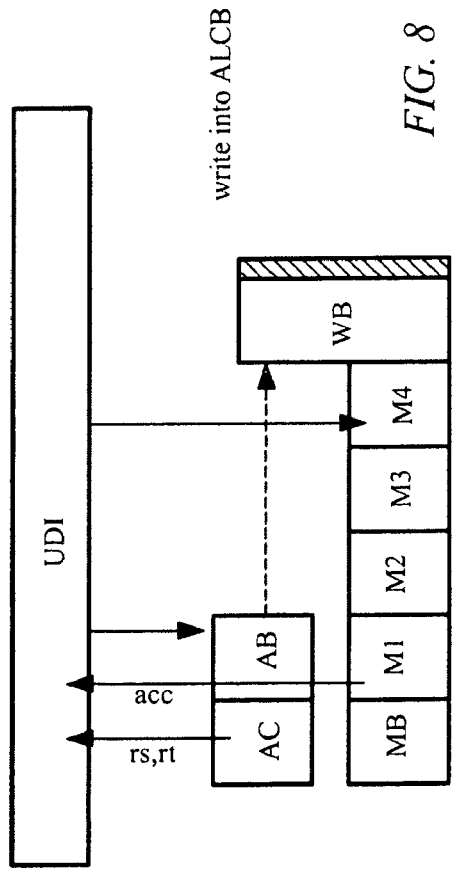
FIG. 8 illustrates user defined instruction results processed in accordance with an embodiment of the invention.

Attention now turns to a write buffer stage interface, which is discussed in connection with FIG. 8. The UDI results are written back to the ALCB based on the latency of the UDI instruction. The write scheme is such that the ALCB does not need to dedicate a write port to the UDI.

1. UDI instructions that are 2 cycles (AC-AB), generate GPR results, and return data in AB will be written to the ALCB via the ALU Pipe write port.
2. UDI instructions that are 5 cycles (MB-M1-M2-M3-M4), generate GPR results or accumulator results, and return data in M4 will be written to the ALCB via the MDU Pipe write port.
3. UDI instructions that read or write an accumulator write their result to the ALCB via the MDU Pipe write port.
4. UDI instructions that are longer than 5 cycles are treated as a divide. The IDU locks out the MDU and does not issue subsequent MDU or UDI instructions. When the UDI result is ready, is uses the MDU Pipe write port.
5. UDI instructions that do not fit cases (1) through (4) require the UDI to add staging registers to make the instruction fall into one of the above cases.

The UDI results are written to the core in AB or M4. This depends on the instruction information presented during the decode. The UDI write is unconditional, and thus the core does not send a write acknowledgement to the TP block.

Commit and kill signals are sent to the UDI from the GRU. The UDI cannot commit internal state until the instruction has graduated and no exceptions are flagged. The commit and kill signals are sent in GC.

Complete UDI interface signals for an embodiment of the invention are described in the following tables: Table 1, Table 2, and Table 3. The direction column is with respect to the external user execution block 104. In general, any unused output should be tied low except for UDI_ri_rf, which should be tied high (to indicate that no user-defined instruction is implemented).

TABLE 1

UDI Common Interface Signals

| Name | Direction | Relative Timing | Description |
|---|---|---|---|
| UDI_instate_xx | O | static | When high, indicates that the CorExtend has local state. |
| UDI-piped_xx | O | static | When high, indicates that the CorExtend is not pipelined. This will affect the dispatch rules to the CorExtend. |
| UDI_ir_dd[31:0] | I | early | Instruction word in the DD stage. Used to indicate whether the UDI operation is supported, and specify source and destination register usage. |
| UDI_ri_dr | O | mid | When high, indicates that the SPECIAL2 instruction in this pipe stage is not supported and will cause the core to take a Reserved Instruction exception |
| UDI_use_rs_dd | O | mid | The UDI will use the RS source operand when asserted. |
| UDI_us_rt_dd | O | mid | The UDI will use the RT source operand when asserted. |
| UDI_use_rd_dd | O | mid | The UDI will write the destination in the RD field of the instruction. UDI_gpr_wr_data_ms result bus should be written to this register |
| UDI_inst_info_dd[1:0] | O | mid | Encoding to indicate when the UDI results are ready. Three writeback possibilities are allowed. The UDI writes GPR results after 2 cycles. The UDI writes GPR or HI/LO results after 5 cycles. The UDI writes results after more than 5 cycles. This encoding will also indicate if the UDI writes private state. |

TABLE 1-continued

UDI Common Interface Signals

| Name | Direction | Relative Timing | Description |
|---|---|---|---|
| UDI_kd_mode_dd | I | early | Indicates that this instruction is executing in kernel or debug mode. This can be used to prevent certain UDI instructions from being executed in user mode. Note that a hazard may exist if mode change occurs on a nearby instruction. |
| UDI_resource_cnt_xx[3:0] | O | static | When TP block has local CorExtend states, this signal indicates the number of internal buffers to hold the result before the instruction graduates. Will be ignored if no local CorExtend states are implemented. |
| UDI_resource_credit_xx | O | mid | Indication to increment the IDU counter of internal buffers if local CorExtend state is implemented. Can be 0, 1, or 2 since at most 2 buffers can be freed up. Will be ignored if no local CorExtend states is implemented. |
| UDI_nxt_opc_xx[31:0] | I | late | Possible next instruction word to start executing in the CorExtend block. The cycle before UDI_start_xx is asserted, this word will be the opcode of the instruction to start executing. The CorExtend block can decode the instruction word to detect data dependency and set up the controls to the datapath. The CorExtend block may choose to register this signal and use it when the cycle UDI_start_xx is asserted. |
| UDI_endinab_xx | I | late | Indicates that the instruction dispatched this cycle is executing in Big Endian mode. This signal is generally only needed when a) the UDI instruction works on sub-word data that is endian dependent, and b) the TP block is designed to be bi-endian. Note that a hazard may exist if a nearby instruction is changing endianness via Status.RE. The CorExtend block may choose to register this signal and use it when the cycle UDI_start_xx is asserted. |
| ****UDI-start_xx | I | early | Asserted to indicate that the instruction sent on UDI nxt_opc_xx in the previous cycle is dispatched this cycle. If the operation requires GPR operands they are valid as well. The CorExtend block can use this signal to conditionally register the result in the first stage of the data path. The accumulator operand is valid in the next cycle after start is asserted. |
| UDI_rs_xx[31:0] | I | early | RS source operand data. Asserted the same cycle as UDI_start_xx. |
| UDI_rt_xx[31:0] | I | early | RT source operand data. Asserted the same cycle as UDI_start_xx. |
| UDI_busy_xx | O | late | The CorExtend module is busy executing at least one pending instruction. This signal does not need to include the instruction which is starting in the current cycle. Core will only enter WAIT-induced sleep mode when no UDI operations are pending. |
| UDI_gpr_wr_data_xx[31:0] | O | mid | CorExtend result destined for a GPR. This value is only valid when UDI gpr_wr_strobe_xx is asserted. |
| UDI_gpr_wr_strobe_xx | O | mid | Single cycle strobe indicating validity of GPR result data. |
| UDI _commit_gc | I | mid | CorExtend instruction can commit local CorExtend state. |
| UDI_kill_gc | I | mid | Kill signal from core to kill all uncommitted instructions in the UDI pipeline. |
| UDI_greset_pre | I | mid | Used to generate reset signal which in turn can be used to initialize any local CorExtend state. |
| UDI_gclk | I | N/A | Processor clock. |
| UDI_gfclk | I | N/A | Free-running clock used with UDI_greset_pre to generate reset signal. |
| UDI_gscanenable | I | N/A | Global scan enable. |
| UDI_present | O | static | Static signal that denotes whether any UDI module is connected to the core. |
| UDI_honor_cee | O | static | Indicates whether the core should honor the CorExtend Enable (CEE) bit contained in the Status register. When this signal is asserted, Status.CEE is deasserted, and a UDI operation is attempted, the core will take a CorExtend Unusable Exception. |
| UDI_perfcnt_event | O | Early | Implementation specific CorExtend performance counter event. When this event is selected, the performance counter will increment every cycle that this signal is asserted. |

The CorExtend interface signals for access to the HI/LO accumulator registers located within the MDU are described in Table 2.

| Name | Direction | Relative Timing | Description |
|---|---|---|---|
| UHL_use_hilo_dd | O | mid | Asserted to indicate that UDI instruction specified by UDI_ir_rf[31:0] accesses (reads and/or writes) the HI and/or LO register. |
| UHL_wr_hilo_dd | O | mid | Asserted to indicate that UDI instruction specified by UDI_ir_rf[31:0] writes to the HI and/or LO register. Note that an instruction cannot write to a GPR and the HI/LO register. |

-continued

| Name | Direction | Relative Timing | Description |
|---|---|---|---|
| UHL_hi_rd_data_xx[31:0] | I | early | Value read from Hi register. Valid one cycle after UDI_start_xx is asserted. |
| UHL_lo_rd_data_xx[31:0] | I | early | Value read from LO register. Valid one cycle after UDI_start_xx is asserted. |
| UHL_hi_wr_strobe_xx | O | late | Single cycle strobe indicating validity of HI result data. |
| UHL_hi_wr_data_xx[31:0] | O | late | UDI result destined for the HI register. This value is only valid when UHL_hi_wr_strobe_xx is asserted. |
| UHL_lo_wr_strobe_xx | O | late | Single cycle strobe indicating validity of LO result data. |
| UHL_lo_wr_data_xx[31:0] | O | late | UDI result destined for the LO register. This value is only valid when UHL_lo_wr_strobe_xx is asserted. |

The UDI can access the extended Accumulator Register File (4 entries) if DSP ASE is enabled. The UDI cannot access the DSPControl Register.

TABLE 3

UDI DSP HI/LO Interface Signals

| Name | Direction | Relative Timing | Description |
|---|---|---|---|
| UHL_dsp_rd_hilo_dd[1:0] | O | mid | The DSP ASE identifier of the HI and/or LO register being read by the UDI specified by UDI_ir_rf[31:0]. This information is used by the core to drive the values of the corresponding HI and Lo register set onto UHL_hi_rd_data_xx[31:0] and UHL_lo_rd_data_xx[31:0]. If the CorExtend block does not read from new state introduced in the DSP ASE, it should drive 0's on this bus. |
| UHL_dsp_wr_state_dd | O | mid | Indicates whether one of the three additional sets of DSP HI/LO accumulators is being written by the UDI specified by UDI_ir_rf[31:0]. This information along with UHL_dsp_rd_hilo_rf[1:0] is be used by the core to trigger the RI (if Config.3.DSPP=0) or DSPStDi (if Config3.DSPP =1, StatusDSPStDi=0) exception. If the CorExtend block does not write to new state introduced in the DSP ASE, it should clear this signal. |
| UHL_dsp_hilo_wr_xx[1:0] | O | late | The DSP ASE identifier of the HI/LO register being written to. If the CorExtend block does not write to new state introduced in the DSP ASE, it should drive 0's on this bus. |

TABLE 6-4

UDI MT Interface

| Name | Direction | Relative Timing | Description |
|---|---|---|---|
| UHL_mt_context_per_tc | O | static | The signal is used in conjunction with UDI_context_present. If UDI_context_present is deasserted, this signal should be ignored. This signal indicates that UDI has as many contexts as the number of TCs on the core. If this signal is deasserted, UDI has only 1 context. |
| UDI_context_present | O | static | Indicates that UDI has context. |
| UDI_mt_tc_xx[3:0] | I | late | TCID for instruction to be execute. It applies to UDI_nxt_opc_xx. |
| UDI_mt_commit_tc_gc[3:0] | I | late | The TCID for CorExtend internal state control. This TCID is used in conjunction with UDI_commit_gc and UDI _kill_gc. |
| UDI_perfcnt_tcen[8:0] | I | early | Bit mask indicating which TCs the implementation specific CorExtend performance counter event should be counted for. |

The user execution block 104 does not need to send the TCID for write data coming back to the core. The core stores the TCID for all writes to the Date CB.

While various embodiments of the invention have been described above, it should be understood that they have been presented by way of example, and not limitation. It will be apparent to persons skilled in the relevant computer arts that various changes in form and detail can be made therein without departing from the scope of the invention. For example, in addition to using hardware (e.g., within or coupled to a Central Processing Unit ("CPU"), microprocessor, microcontroller, digital signal processor, processor core, System on chip ("SOC"), or any other device), implementations may also be embodied in software (e.g., computer readable code, program code, and/or instructions disposed in any form, such as source, object or machine language) disposed, for example, in a computer usable (e.g., readable) medium configured to store the software. Such software can enable, for example, the function, fabrication, modeling, simulation, description and/or testing of the apparatus and methods described herein. For example, this can be accomplished through the use of general programming languages (e.g., C, C++), hardware description languages (HDL) including Verilog HDL, VHDL, and so on, or other available programs. Such software can be disposed in any known computer readable storage medium such as semiconductor, magnetic disk, or optical disc (e.g., CD-ROM, DVD-ROM, etc.). The software can also be disposed as a computer data signal embodied in a computer usable (e.g., readable) transmission medium (e.g., carrier wave or any other medium including digital, optical, or analog-based medium). Embodiments of the present invention may include methods of providing the apparatus described herein by providing software describing the apparatus and subsequently transmitting the software as a computer data signal over a communication network including the Internet and intranets.

It is understood that the apparatus and method described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the above-described exemplary embodiments, but should be defined only in accordance with the following claims and their equivalents.

The invention claimed is:

1. A processor implemented in hardware, comprising:
a hardware processing core supporting execution of a fixed instruction set and decoding template based user defined instructions specified in a table defining source operands, type of destination register, instruction latency and instruction dependency on private state, wherein decoding includes evaluating the source operands, the type of destination register, the instruction latency and the instruction dependency on private state using a template processing block, wherein the instruction latency is restricted to one of a plurality of pre-defined latencies, and wherein the hardware processing core observes the instruction latency table entries to prevent stall conditions by determining bypass opportunities and operand readiness; and
a hardware user execution block connected to the hardware processing core to execute the template based user defined instructions.

2. The processor of claim 1 wherein the private state is not visible to the hardware processing core.

3. The processor of claim 1 configured to include at least ten pipelined stages.

4. A non-transitory computer readable storage medium, comprising executable instructions to describe:
a hardware processing core supporting execution of a fixed instruction set and decoding of template based user defined instructions specified in a table defining source operands, type of destination register, instruction latency and instruction dependency on private state, wherein decoding includes evaluating the source operands, the type of destination register, the instruction latency and the instruction dependency on private state, wherein an opcode is associated with an instruction dependency on private state table entry which indicates whether user defined instructions have to issue in program order relative to other user defined instructions; and
a hardware user execution block connected to the hardware processing core to execute the template based user defined instructions.

5. The non-transitory computer readable storage medium of claim 4 wherein the private state is not visible to the hardware processing core.

6. The non-transitory computer readable storage medium of claim 4 wherein the executable instructions are selected from a Hardware Description Language (HDL), Verilog, and VHDL.

* * * * *